(12) United States Patent
Koch

(10) Patent No.: US 12,286,244 B2
(45) Date of Patent: Apr. 29, 2025

(54) SATELLITE INCLUDING CROSSOVER POWER PROCESSING UNITS FOR ELECTRIC THRUSTERS

(71) Applicant: Aerojet Rocketdyne, Inc., Sacramento, CA (US)

(72) Inventor: Brian A. Koch, Sacramento, CA (US)

(73) Assignee: Aerojet Rocketdyne, Inc., Sacramento, CA (US)

( * ) Notice: Subject to any disclaimer, the term of this patent is extended or adjusted under 35 U.S.C. 154(b) by 116 days.

(21) Appl. No.: 18/014,404

(22) PCT Filed: Jul. 10, 2020

(86) PCT No.: PCT/US2020/041480
§ 371 (c)(1),
(2) Date: Jan. 4, 2023

(87) PCT Pub. No.: WO2022/010485
PCT Pub. Date: Jan. 13, 2022

(65) Prior Publication Data
US 2023/0294846 A1     Sep. 21, 2023

(51) Int. Cl.
*B64G 1/42*     (2006.01)
(52) U.S. Cl.
CPC .................... *B64G 1/428* (2013.01)
(58) Field of Classification Search
CPC ................. B64G 1/428; F03H 1/00
See application file for complete search history.

(56) References Cited

U.S. PATENT DOCUMENTS

| 2014/0208713 | A1 | 7/2014 | Lorand |
| 2015/0162955 | A1 | 6/2015 | Burch |
| 2016/0122040 | A1* | 5/2016 | Stickelmaier ........ B64G 1/2427 244/171.1 |

FOREIGN PATENT DOCUMENTS

EP    3025967 A1    6/2016

OTHER PUBLICATIONS

Wikipedia Relay (Year: 2020).*
International Search Report and Written Opinion for International Patent Application No. PCT/US2020/041480 completed on Mar. 23, 2021.
International Preliminary Report on Patentability for International Application No. PCT/US2020/041480 mailed Jan. 19, 2023.

* cited by examiner

*Primary Examiner* — Arun Goyal
*Assistant Examiner* — William L Breazeal
(74) *Attorney, Agent, or Firm* — Fox Rothschild LLP; Carol E. Thorstad-Forsyth

(57) ABSTRACT

A spacecraft propulsion system including a first thruster system including a first power processing unit connected to a first thruster string via a crossover switching unit and connected to a second thruster string via the crossover switching unit. A second thruster system including a second power processing unit connected to the second thruster string via the crossover switching unit and to the first thruster string via the crossover switching unit. A controller is connected to each of the first power processing unit, the second power processing unit, and the crossover switching unit.

11 Claims, 3 Drawing Sheets

SATELLITE INCLUDING CROSSOVER POWER PROCESSING UNITS FOR ELECTRIC THRUSTERS

CROSS-REFERENCE TO RELATED APPLICATION

This application claims priority to International Patent Application No. PCT/US2020/041480 filed on Jul. 10, 2020.

TECHNICAL FIELD

The present disclosure relates generally to satellite thruster systems, and more specifically to a satellite including redundant power processing systems for electric thrusters.

BACKGROUND

Satellites and spacefaring systems, utilize built in thrusters to maintain and adjust trajectories and orientations as the system travels through space. The thrusters are either powered by onboard power generation systems, such as a solar power generator, or provided with stored power expected to last a useful life of the spacefaring system. In some examples, the thrusters are electric thrusters and can convert from electrical power to thrust according to known electric thrust generation techniques.

Some power processing units for electric thrust generators are designed to cease functioning upon failure of a power supply unit. Further, some spacefaring systems require redundancy. Existing systems requiring redundant thrusters provide wholly redundant systems such that when one system fails, the redundant system kicks in. By way of example, existing thrust producing systems utilizing redundancy include two distinct sets of redundant thrusters and power processing units and a controller that is configured to activate the backup (redundant) thruster system in the event of a failure in the primary system.

SUMMARY OF THE INVENTION

In one exemplary embodiment a spacecraft propulsion system includes a first thruster system including a first power processing unit connected to a first thruster string via a crossover switching unit and connected to a second thruster string via the crossover switching unit, a second thruster system including a second power processing unit connected to the second thruster string via the crossover switching unit and to the first thruster string via the crossover switching unit, and a controller connected to each of the first power processing unit, the second power processing unit, and the crossover switching unit.

In another example of the above described spacecraft propulsion system the first thruster string and the second thruster string each include at least two thrusters.

In another example of any of the above described spacecraft propulsion systems the at least two thrusters in each of the first thruster string and the second thruster string are electric thrusters.

In another example of any of the above described spacecraft propulsion systems the at least two thrusters in each of the first thruster string and the second thruster string are hall effect electric thrusters.

In another example of any of the above described spacecraft propulsion systems the crossover switching unit includes a first plurality of switches, each of the switches in the first plurality of switches being one of a mechanical contactor, a relay, a latching relay and a solid state switch and the crossover switching unit includes a second plurality of switches, each of the switches in the second plurality of switches being one of a mechanical contactor, a relay, a latching relay and a solid state switch.

In another example of any of the above described spacecraft propulsion systems each switch in the first plurality of switches and the second plurality of switches is a latching relay.

In another example of any of the above described spacecraft propulsion systems the first plurality of switches in the crossover switching unit and the second plurality of switches in the crossover switching unit are approximately identical.

In another example of any of the above described spacecraft propulsion systems the crossover switching unit includes seven latching relays per thruster in the corresponding thruster string.

In another example of any of the above described spacecraft propulsion systems the controller includes a control module configured to demultiplex an output of one of the first power processing unit and the second power processing unit using the crossover switching unit, such that the first power processing unit provides output signals to the first thruster string and the second thruster string.

An exemplary method for providing crossover redundancy in a spacecraft propulsion system includes connecting a first power processing unit to a first thruster string using a crossover switching unit and to a second thruster string using the crossover switching unit, connecting a second power processing unit to the first thruster string using the crossover switching unit and to the second thruster string using the crossover switching unit, and controlling the crossover switching unit with a controller such that the first power processing unit signals are passed through the crossover switching unit to the first thruster string and the second power processing unit signals are passed through the crossover switching unit to the second thruster string.

Another example of the above described method for providing crossover redundancy in a spacecraft propulsion system further includes controlling the crossover switching unit with the controller such that the crossover switching unit demultiplexes signals from the first power processing unit to the first and second thruster strings in response to a fault in the second power processing unit.

In another example of any of the above described methods for providing crossover redundancy in a spacecraft propulsion system controlling the crossover switching unit with a controller includes commanding a state of each switch in a first plurality of switches within the crossover switching unit and commanding a state of each switch in a second plurality of switches within the crossover switching unit using the controller.

Another example of any of the above described methods for providing crossover redundancy in a spacecraft propulsion system further includes latching each switch in the first plurality of switches and latching each switch in the second plurality of switches such that continued commands from the controller are not required to maintain a desired switch state.

In another example of any of the above described methods for providing crossover redundancy in a spacecraft propulsion system each switch in the first plurality of switches and each switch in the second plurality of switches is a latching relay.

In another example of any of the above described methods for providing crossover redundancy in a spacecraft propulsion system the crossover switching unit includes a first plurality of switches and a second plurality of switches, and wherein each plurality switches includes at least one of a mechanical contactor, a relay, a latching relay and a solid state switch.

In another example of any of the above described methods for providing crossover redundancy in a spacecraft propulsion system controlling the crossover switching unit with the controller comprises connecting each power processing unit to the corresponding thruster string as a single unit.

In another example of any of the above described methods for providing crossover redundancy in a spacecraft propulsion system controlling the crossover switching unit with the controller comprises connecting each power processing unit to each thruster in the corresponding thruster string independently.

These and other features of the present invention can be best understood from the following specification and drawings, the following of which is a brief description.

DETAILED DESCRIPTION

Figure 1:
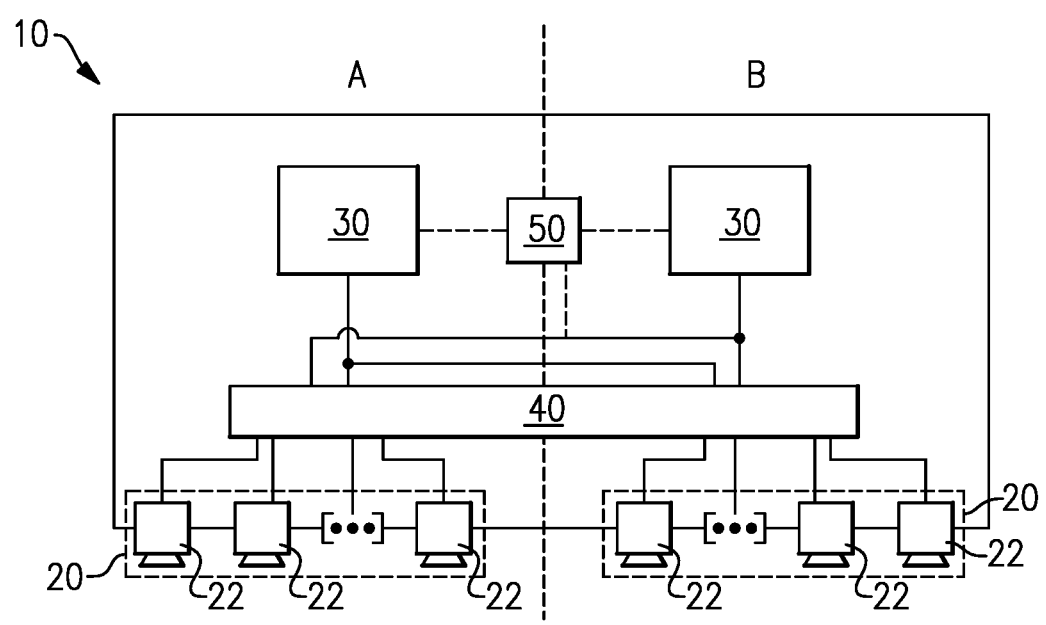
FIG. 1 illustrates an exemplary satellite including a crossover redundant power processing configuration.

FIG. 1 schematically illustrates an exemplary satellite 10 including a spacefaring propulsion system having two thruster strings 20. In the illustrated example, each thruster string 20 includes four electric thrusters 22. In alternative practical embodiments, thruster strings can include any number of thrusters including a single thruster string. The electric thrusters 22 can be any type of thruster configured to convert electric power to thrust in spacefaring conditions. While illustrated in a linear configuration schematically in FIG. 1, it is appreciated that the thrusters in a practical implementation are disposed in varying positions and orientations about the satellite 10. In one practical example the electric thrusters 22 are hall effect electric thrusters. In alternative examples, alternative electric thruster types can be used to similar effect. In order to provide electric power to the thrusters 22 in each thruster string 20, a corresponding power processing unit 30 is connected to the thruster string 20 via a switching unit 40. While illustrated schematically in the exemplary satellite 10 as single lines, the connections between the power processing units 30 and the switching unit 40, as well as the connections between the switching unit 40 and the thrusters 22, are multiple electrical connections as may be required to power or control the thrusters 22. The combined power processing unit 30, switching unit 40 and thruster string 20 is referred to herein as a thruster system, and the illustrated satellite 10 includes two thruster systems A, B.

A controller 50 is connected to each of the power processing units 30 and the switching unit 40 via communication lines 52. The controller 50 is a dedicated thruster systems controller in some examples. In alternative examples, the controller 50 is a general satellite systems controller including specialized hardware or software enabling the controller 50 to provide operational controls to the thruster systems including a crossover redundancy control.

The satellite 10 in the illustrated example includes two redundant thruster systems A, B, each of which includes a corresponding power processing unit 30 and a thruster string 20, with a crossover switching unit 40 connecting the power processing unit 30 to the thruster string 20. The switching unit 40 facilitates a crossover redundancy by cross connecting each power processing unit 30 with the thruster string 20 of the other thruster system A, B thereby allowing each power processing unit 30 to control either of the thruster strings 20 in the event that one of the power processing units 30 is disabled. In some examples, the crossover switching unit 40 can operate in a binary mode such that the switching unit 40 switches a power processing unit 30 connection from one thruster string 20 to the other thruster string 20 as a single unit connection. In alternative examples, the switching unit 40 is configured to switch the connection between the power processing unit 30 and each individual thruster 22 within the thruster strings 20 independently of the other thrusters 22.

The switching unit 40 allows each thruster 22 in the thruster strings 20 to be redundantly powered by either power processing unit 30 at any given time. In the event of power processing unit 30 failure, the power processing unit 30 of the other thruster system A, B can be switched via the switching unit 40 to provide power to the thrusters 22 of the thruster string 20 in the other thruster system A, B as needed. In examples where the switching unit 40 is configured to switch each thruster 22 independently, the switching unit 40 allows for each individual thruster 22 to be individual powered by either power processing unit 30 depending on the controls indicated by the controller 50, and the power processing unit is not required to be switched on a thruster string basis.

The ability for one power processing unit 30 to crossover to connect with the thrusters 22 of the other thruster system A, B using the switching unit 40 is referred to as a crossover and the arrangement illustrated herein is referred to as a crossover configuration.

In some examples, two or more thruster strings 20 can be operated simultaneously or sequentially during conventional operations, with each power processing unit 30 controlling one of the corresponding thruster strings 20. If one power processing unit 30 fails during the operation of the satellite 10, the other power processing unit 30 is controlled to alternate between providing power to the thruster in its thruster system A, B and the corresponding thruster 22 in the other thruster system A, B. In this example failure state, the controller 50 is configured to de-multiplex the connections from the good power processing unit 30 (e.g. a power processing unit that is not in a failed state) to each of the corresponding thrusters 22 or thruster strings 20 using the switching unit 40.

Figure 2:
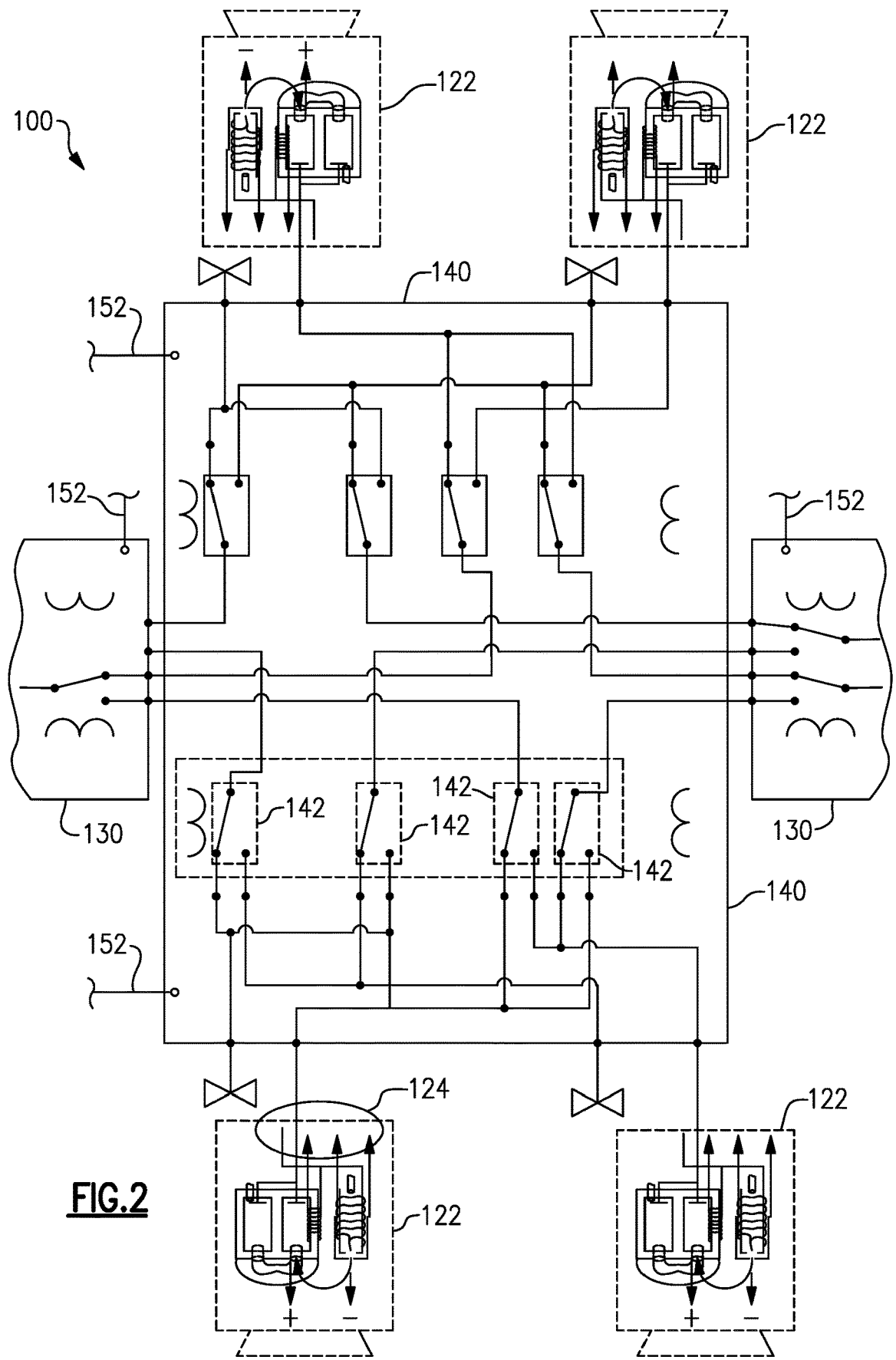
FIG. 2 schematically illustrates an exemplary relay system for powering a set of four electric thrusters within a redundant crossover power processing system.

With continued reference to FIG. 1, and with like numerals indicating like elements, FIG. 2 schematically illustrates a partial view of a thruster system 100 including two distinct power processing units 130 providing redundant crossover power to the thrusters 122 via switches 142 within a switching unit 140. Each of the switching unit 140, and the power processing units 130 are connected to the controller 50 (pictured in FIG. 1) via a communication line 152. The communication line 152 controls the state of each of the switches 142 within the crossover switching unit 140. In some examples, the switches 142 include at least one of mechanical contactors, relays, latching relays and solid state switches. In another example, each of the switches 142 is a latching relay. In the example using latching relays, the latching ability of the relays causes the state of the switches 142 to be latched into whatever state was most recently commanded by the controller 50, with the minimal power of the control communication being sufficient to establish and latch the state of the switcher 142. The latching reduces the required power expenditure to maintain operations, relative to other switch types, as no continuous power source is required to maintain either state of any given latching relay.

Each of the thrusters 122 in the example is a hall effect thruster and includes multiple connections 124 to the power processing units 130, with the connections 124 being illustrated in FIG. 2 as a single connection line. It is understood that each switch 142 schematically represents a set of approximately identical switches for simultaneously switching the connection of the power processing unit 130 from one set of thrusters 122 to the other set of thrusters 122.

The illustrated configuration of FIG. 2 includes two thrusters 122 from each string of thrusters 20 (illustrated in FIG. 1), and each of the power processing units 130 providing power to one string of thrusters 20. The left power processing unit 130 provides electrical power to the top left and bottom left thruster 122, and the right power processing unit 130 provides power to the top right and bottom right thrusters 122. The controls, and specific signals connected to the thrusters 122 are conventional and depend on the type of thruster (e.g. hall effect thrusters) and power processing unit 130 used in thruster system 100.

Figure 3:
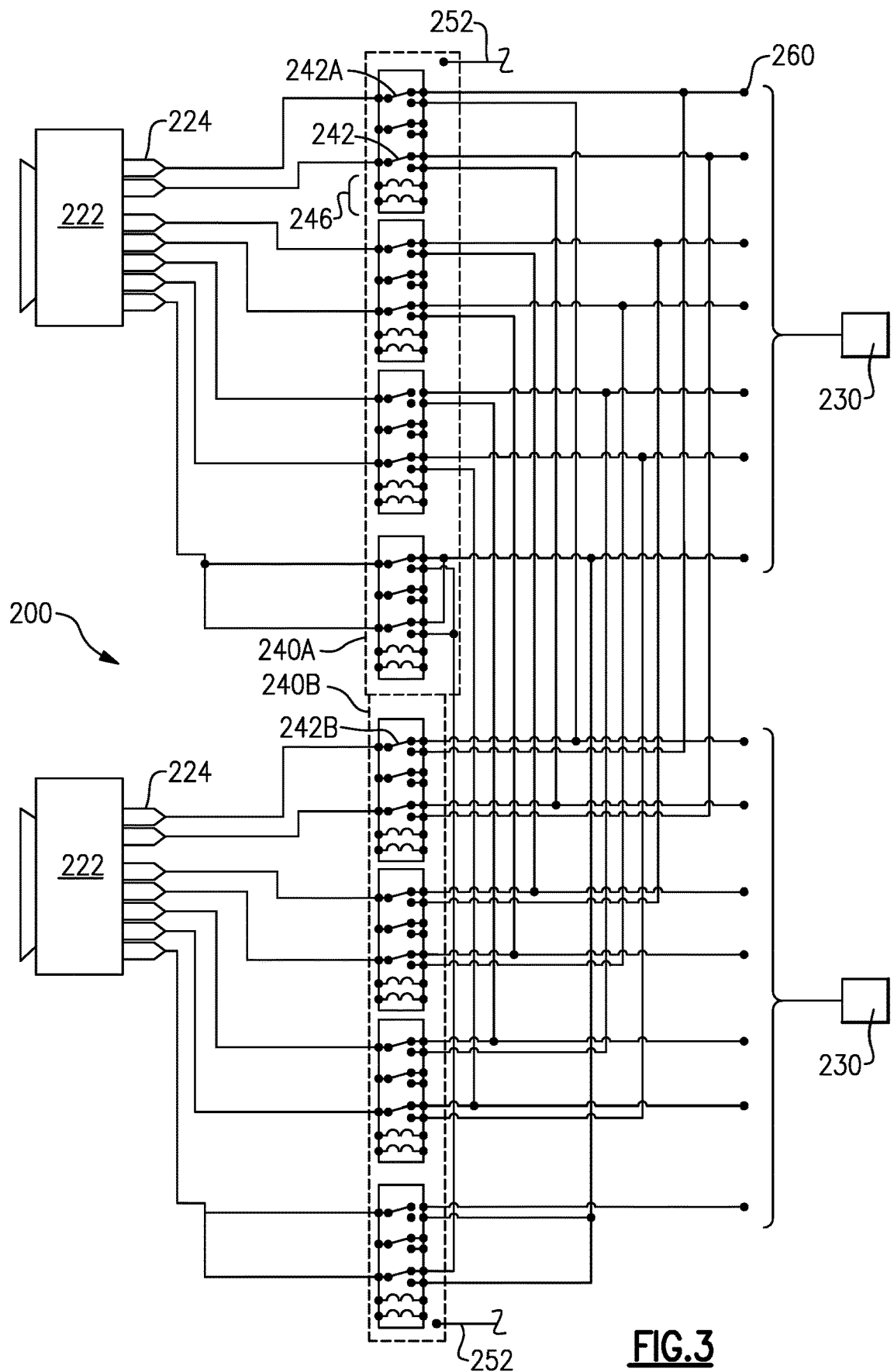
FIG. 3 schematically illustrates a more detailed crossover switching unit configuration for a pair of corresponding thrusters in different thruster strings.

With continued reference to FIGS. 1 and 2, FIG. 3 illustrates one schematic detail 200 of the switching unit 240, which includes two sets of switches 240A, 240B, and connects two corresponding hall effect thrusters 222 in different thruster systems. In an alternative example, the positions of the thrusters 222 and the power processing units 230 are reversed with the thrusters 222 being connected to the right side connections and the power processing units being connected to the left side connections in the illustrated schematic. The switching unit 40 of FIG. 1 includes an identical switching configuration, with the switching configurations 240A, 240B of FIG. 3 being replicated for each thruster 222 in the thruster string 20 in one example.

Each switching unit 240A, 240B receives seven power processing inputs 260 from the corresponding power processing unit 230. Seven of the power processing inputs are provided to switches 242 in each of the switching units. The switches in each switching unit 240 are operated in conjunction to ensure that during normal operation each power processing signal is provided to only one of the thrusters 222. In the event that one of the power processing units 230 fails, the switches 242 can be toggled to switch the control signals from one thruster 222 to the other thruster 222, with the controller using the toggling to demultiplex signals from the functioning power processing unit 230 to power both thrusters 222. The seventh signal 260 functions similarly, but requires two switches 242 operated in identical states.

In the illustrated example, one pair of the signals is used to control propellant control valves of the thruster 222. Discharge power for the hall effect thruster 222 is provided through an anode connection and returned to the power processing unit 230 by the cathode connection. Another connection powers a cathode heater that is provided to heat the cathode sufficiently for operation and the cathode keeper to support electron extraction from the keeper both share the cathode connection with the discharge for return. a magnet connection provides a path for the electromagnet used to establish the magnetic fields that are used for hall effect thruster operation. The described signals and functions included herein are exemplary in nature and do no prohibit alternative switching configurations and signal functions.

In addition to the relay switches, the illustrated switch sets 240A, 240B include coils 246. The coils 246 use the power in the control signal 252 to latch the relays 242 into the most recently commanded position (state). The latching allows the connections to the power processing unit 230 to be passed through the switching units 240A, 240B without requiring continuous application of power to the switching unit 240A, 240B to maintain the desired switch position (state).

While described and illustrated herein in a structure having four thrusters per string, it is appreciated that a practical implementation can include any number of thrusters per string, and the switching units can be modified to accommodate the additional thrusters with minimal modifications to the disclosed structure. Further, while illustrated with two channels and switching units cross connecting power processing units between the two channels, one of skill in the art can expand the scope of the disclosed structure to include three or more channels, by including switching systems having latching relays or other switching networks with a number of states corresponding to the number of power processing units.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A spacecraft propulsion system comprising:
a first thruster system including a first power processing unit connected to a first thruster string via a crossover switching unit and connected to a second thruster string via the crossover switching unit;
a second thruster system including a second power processing unit connected to the second thruster string via the crossover switching unit and to the first thruster string via the crossover switching unit, wherein the second power processing unit is separate from the first power processing unit, and the first power processing unit and the second power processing unit are included in respective ones of the first thruster system and the second thruster system; and
a controller connected to each of the first power processing unit, the second power processing unit, and the crossover switching unit;
wherein the crossover switching unit includes a first plurality of switches and a second plurality of switches; and
wherein each switch in the first plurality of switches and the second plurality of switches is a latching relay with input terminals respectively connected to the first power processing unit and the second power processing unit and configured to switch a connection to the first thruster string or the second thruster string between the first power processing unit and the second power processing unit.
2. The spacecraft propulsion system of claim 1, wherein the first thruster string and the second thruster string each include at least two thrusters.

3. The spacecraft propulsion system of claim 2, wherein the at least two thrusters in each of the first thruster string and the second thruster string are electric thrusters.

4. The spacecraft propulsion system of claim 3, wherein the at least two thrusters in each of the first thruster string and the second thruster string are hall effect electric thrusters.

5. The spacecraft propulsion system of claim 1, wherein the first plurality of switches in the crossover switching unit and the second plurality of switches in the crossover switching unit are approximately identical.

6. The spacecraft propulsion system of claim 1, wherein the crossover switching unit includes seven latching relays per thruster in each respective corresponding thruster string.

7. The spacecraft propulsion system of claim 1, wherein the controller includes a control module configured to demultiplex an output of one of the first power processing unit and the second power processing unit using the crossover switching unit, such that the first power processing unit provides output signals to the first thruster string and the second thruster string.

8. A method for providing crossover redundancy in a spacecraft propulsion system comprising:
   connecting a first power processing unit to a first thruster string using a crossover switching unit and to a second thruster string using the crossover switching unit;
   connecting a second power processing unit to the first thruster string using the crossover switching unit and to the second thruster string using the crossover switching unit, wherein the second power processing unit is separate from the first power processing unit and the first power processing unit and the second power processing unit are included in respective ones of the first thruster system and the second thruster system;
   connecting a controller to each of the first power processing unit, the second power processing unit, and the crossover switching unit; and
   controlling the crossover switching unit with the controller such that the first power processing unit signals are passed through the crossover switching unit to the first thruster string and the second power processing unit signals are passed through the crossover switching unit to the second thruster string;
   wherein the controlling the crossover switching unit with the controller includes commanding a state of each switch in a first plurality of switches within the crossover switching unit and commanding a state of each switch in a second plurality of switches within the crossover switching unit using the controller; and
   wherein each switch in the first plurality of switches and the second plurality of switches is a latching relay with input terminals respectively connected to the first power processing unit and the second power processing unit and configured to switch a connection to the first thruster string or the second thruster string between the first power processing unit and the second power processing unit.

9. The method of claim 8, further comprising: controlling the crossover switching unit with the controller such that the crossover switching unit demultiplexes signals from the first power processing unit to the first thruster string and the second thruster string in response to a fault in the second power processing unit.

10. The method of claim 8, wherein controlling the crossover switching unit with the controller comprises connecting each power processing unit of the first power processing unit and the second power processing unit to the corresponding thruster string as a single unit.

11. The method of claim 8, wherein controlling the crossover switching unit with the controller comprises connecting each power processing unit of the first power processing unit and the second power processing unit to each thruster of the first thruster string and the second thruster string independently.

* * * * *